(12) United States Patent
Takahashi et al.

(10) Patent No.: US 6,237,933 B1
(45) Date of Patent: May 29, 2001

(54) VEHICLE INTERIOR MEMBER HAVING AIR BAG DOOR PORTION AND METHOD FOR MOLDING THE SAME

(75) Inventors: Hideaki Takahashi; Junzo Ukai, both of Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/291,214

(22) Filed: Apr. 14, 1999

(30) Foreign Application Priority Data

Apr. 28, 1998 (JP) .................................................. 10-119718

(51) Int. Cl.[7] .................................................. B60R 21/20
(52) U.S. Cl. ........................................ 280/728.3; 280/732
(58) Field of Search .................................... 280/731, 732, 280/728.3, 728.1

(56) References Cited

U.S. PATENT DOCUMENTS

| | | | |
|---|---|---|---|
| 5,487,558 | 1/1996 | Ball et al. | 280/728.3 |
| 5,632,914 | 5/1997 | Hagenow et al. | 280/728.1 |
| 5,744,776 | 4/1998 | Bauer | 219/121.7 |
| 6,109,645 | * 8/2000 | Totani et al. | 280/732 |

FOREIGN PATENT DOCUMENTS

| | | | |
|---|---|---|---|
| 3904977 | * 1/1990 | (DE) | 280/728.3 |
| 2-99324 | 4/1990 | (JP) . | |
| 9-156443 | 6/1997 | (JP) . | |
| 9-300400 | 11/1997 | (JP) . | |

\* cited by examiner

Primary Examiner—Eric Culbreth
(74) Attorney, Agent, or Firm—Oliff & Berridge, PLC

(57) ABSTRACT

A vehicle interior member with an air bag includes an air bag door portion that can be made to be invisible and of improved construction. The vehicle member includes a skin molded to a substrate. The skin includes a tear line formed by a diagonal cut portion. In the vicinity of a lateral tear line of the skin side tear line, a projecting portion is provided on a lower mold to form a groove portion of the substrate along the diagonal cut portion so as to intercept a flow of a resin from the cutting direction of the diagonal cut portion. Therefore, as the resin flows in a reverse direction to the cutting direction of the diagonal cut portion at an opening portion thereof, a flow of the resin into a polypropylene foam layer of a three-layer skin through the opening portion of the diagonal cut portion can be suppressed. This prevents the polypropylene foam layer from being melted and damaged.

17 Claims, 9 Drawing Sheets

VEHICLE INTERIOR MEMBER HAVING AIR BAG DOOR PORTION AND METHOD FOR MOLDING THE SAME

INCORPORATION BY REFERENCE

The disclosure of Japanese Patent Application No. HEI 10-119718 filed on Apr. 28, 1998 including the specification, drawings and abstract is incorporated herein by reference in its entirety.

BACKGROUND OF THE INVENTION

1. Field of Invention

The present invention relates to a vehicle interior member having an air bag door portion, and more particularly to a door portion of an air bag system formed in the vehicle interior member, such as an instrument panel. The present invention further relates to a method for molding the same.

2. Description of the Related Art

Conventionally a vehicle interior member having an air bag door portion such as the instrument panel is known and disclosed, for example, in Japanese Patent Application Laid-open No. HEI 9-156443.

In this instrument panel having the air bag door portion, a three-layer skin including a foam layer as an intermediate layer is disposed on a surface (design face) of a resin substrate constituting a body portion and the air bag door portion of the instrument panel.

However, in order to mold the product having the air bag door portion of the instrument panel invisible (designed to have a relief such as a tear line invisible), the following process is required. A three-layer skin 72 having a cut portion 70 for a tear line at a skin side formed on a back surface thereof is set in an upper mold 74 of molds 74 and 76. Then, a resin 78 is injected into the mold as shown in FIG. 9. In this case, when the resin 78 moves along an injection direction (a direction shown by the arrow X in FIG. 9), a foam layer 72A of the three-layer skin 72 is compressed by the resin 78 toward the upper mold 74 (a direction shown by the arrow Y in FIG. 9). As a result, each thickness of two sections of the three-layer skin 72 separated by the cut portion 70 becomes different. Thus, the resin 78 in a molten state flows through the cut portion 70 into the foam layer 72A that is not compressed. As a result, the foam layer 72A is damaged to form, for example, an undesirable recess on the design face of the product, which degrades the quality of the appearance. For this reason, the conventional technology has never achieved an air bag door portion that is invisible.

SUMMARY OF THE INVENTION

In view of these problems, it is an object of the invention to provide a vehicle interior member having an air bag door portion that prevents a foam layer from being melted and damaged, has an invisible air bag door portion, and improves design even after setting a three-layer skin formed with a cut portion forming a skin side tear line in a mold and injection insert molding a substrate.

To achieve the above and other objects, according to a first aspect of the present invention, there is provided a vehicle interior member having an air bag door portion including a three-layer skin, a body portion substrate formed of a hard resin material and injection molded together with the three-layer skin, and an air bag door portion substrate formed of the same hard resin material as the body portion and injection molded integrally with the body portion substrate. The air bag door portion substrate has a groove portion forming a substrate side tear line that is formed during the injection molding to define a shape of a projecting portion formed on a mold and torn upon deployment of an air bag. The three-layer skin has a diagonal cut portion forming a skin side tear line that is formed to extend from a face of the three-layer skin, the face being close to the air bag door portion substrate, at a predetermined inclination angle such that an opening portion of the diagonal cut portion is directed substantially toward the groove portion forming the substrate side tear line.

Therefore, if the three-layer skin is set in the mold and then the three-layer skin and the substrate of the body portion and the air bag door portion are integrally molded by injection molding, a resin flow from a cutting direction of the diagonal cut portion is suppressed by a projecting portion formed on the mold to form the groove portion forming the tear line at the substrate side. Accordingly, the resin flows in a reverse direction to the cutting direction of the diagonal cut portion at the opening portion of the diagonal cut portion of the three-layer skin. As a result, even if the three-layer skin is compressed by the resin, each section separated by the diagonal cut portion may not become a different thickness. Also, the resin flow into a foam layer of the three-layer skin through the opening of the diagonal cut portion can be suppressed, thus preventing the foam layer from being melted and damaged. Therefore, the air bag door portion can be made invisible and the design can be improved. Also, the present invention can be easily achieved by adjusting the incline angle of the diagonal cut portion of the three-layer skin and a thickness of the substrate at the groove portion forming the tear line at the substrate side.

According to a second aspect of the present invention, there is provided a vehicle interior member having an air bag door portion including an air bag door portion having a three-layer skin and a substrate formed of a hard resin and injection molded together with the three-layer skin, and a body portion to which the air bag door portion is fixed. The air bag door portion substrate has a groove portion forming a substrate side tear line that is formed during the injection molding to define a shape of a projecting portion formed on a mold and is torn upon deployment of an air bag. The three-layer skin has a diagonal cut portion forming a skin side tear line which is formed to extend from a face of the three-layer skin, the face being close to the air bag door portion substrate, at a predetermined inclination angle such that an opening portion of the diagonal cut portion is directed toward the groove portion forming the substrate side tear line.

Therefore, in addition to substantially the same advantages as achieved by the first aspect of the invention, the second aspect of the invention achieves the following advantages. Materials for the skins and substrates of the air bag door portion and the body portion can be separately and freely selected. Considering the design face, the skin of the air bag door portion skin and the skin of the air bag door portion may be formed from the same material in order to make the air bag door portion inconspicuous. The substrate of the air bag door portion and the substrate of the body portion substrate may be formed from different kinds of hard resins in accordance with their performance requirements.

According to a third aspect of the present invention, there is provided a vehicle interior member based on the first or second aspect, in which the diagonal cut portion and the groove portion are positioned such that an edge of the substrate of a passenger side portion which has been torn and deployed upon deployment of the air bag door is hidden by the skin.

Therefore, the edge of the substrate of a passenger side portion which has been torn and deployed upon deployment of the air bag door is hidden by an end portion of the skin of the passenger side door portion that has been torn and deployed upon deployment of the air bag door so that the edge is not exposed.

According to a fourth aspect of the invention, there is provided a vehicle interior member having an air bag door portion including a three-layer skin, a body portion substrate formed of a hard resin material and injection molded together with the three-layer skin, and an air bag door portion substrate formed of the same hard resin material as the body portion substrate and injection molded integrally therewith. The three-layer skin has a diagonal cut portion forming a skin side tear line that has a cutting direction inclined in a direction substantially reverse to a flow direction of the hard resin during injection molding of the body portion substrate and the air bag door portion substrate and is torn upon deployment of an air bag.

According to a fifth aspect of the invention, there is provided a vehicle interior member based on the fourth aspect of the invention, wherein the skin side tear line and a substrate side tear line extend in a direction substantially parallel to the flow direction of the hard resin, and wherein the air bag door portion substrate has a thin portion that is formed adjacent to the groove, the thin portion being positioned at a site facing an opening portion of the diagonal cut portion and extending along the opening portion of the diagonal cut portion in a direction substantially parallel to the flow direction of the hard resin.

Therefore, as the thin portion formed in the substrate substantially prevents the resin from flowing toward the opening portion of the diagonal cut portion, the direction of the resin flowing at the opening portion of the diagonal cut portion is in the reverse direction to the cutting direction of the diagonal cut portion. As a result, the resin flow into the foam layer of the three-layer skin through the opening portion of the diagonal cut portion can be suppressed, thus effectively preventing the foam layer from being melted and damaged.

According to a sixth aspect of the invention, there is provided a vehicle interior member having an air bag door portion including an air bag door portion having a three-layer skin and a substrate formed of a hard resin and injection molded together with the three-layer skin, and a body portion to which the air bag door portion is fixed, wherein the three-layer skin has a diagonal cut portion forming a skin side tear line that has a cutting direction inclined in a direction substantially reverse to a flow direction of the hard resin during injection molding of the air bag door portion substrate and is torn upon deployment of an air bag.

According to a seventh aspect of the present invention, there is provided a method for molding a vehicle interior member having an air bag door portion including the steps of: setting a three-layer skin having a diagonal cut portion with a cutting direction inclined relative to a surface in a first mold; assembling the first mold and a second mold; injecting a hard resin into a cavity defined by the three-layer skin and the second mold to form a substrate of an interior member integrally with the three-layer skin while controlling injection of the hard resin such that a flow direction of the hard resin is substantially opposite to the cutting direction of the diagonal cut portion; and cooling an integral molding of the three-layer skin and the substrate after injecting the hard resin.

DETAILED DESCRIPTION OF THE PREFERRED EMBODIMENTS

Figure 1:
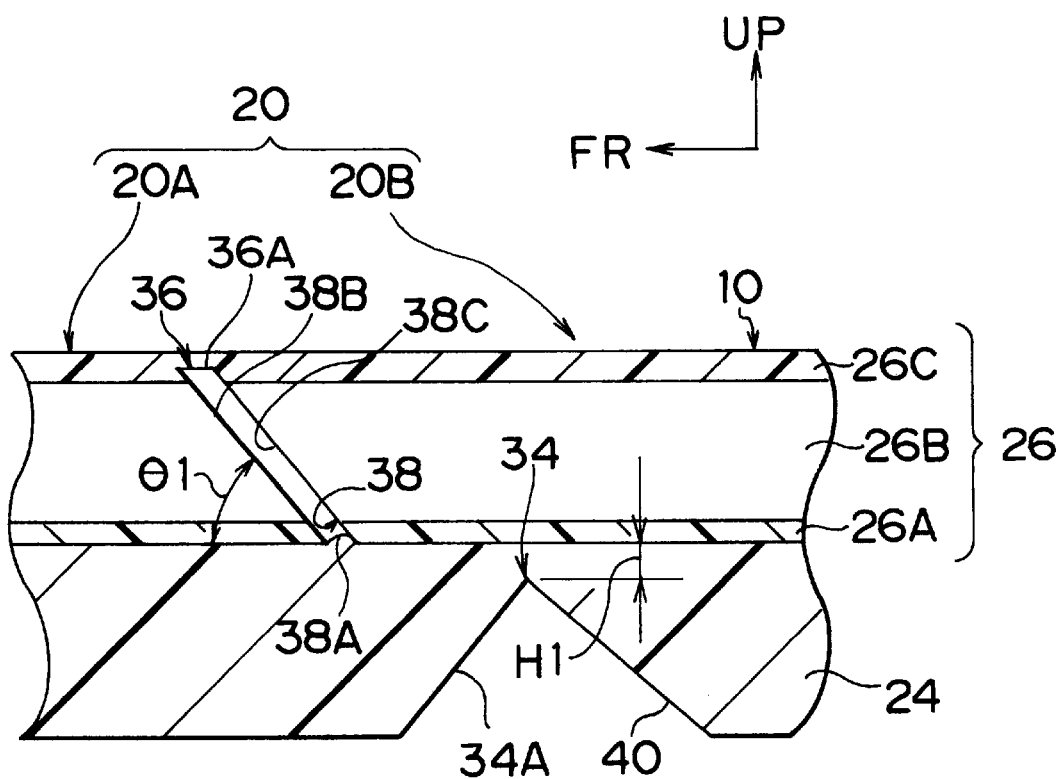
FIG. 1 is an enlarged sectional view taken along line I—I in FIG. 3.

An embodiment of a vehicle interior member provided integrally with an air bag door portion of the present invention will be described according to FIGS. 1 to 7.

In the drawings, the arrow FR shows a front direction of a vehicle and the arrow UP shows an upward direction of the vehicle.

Figure 4:
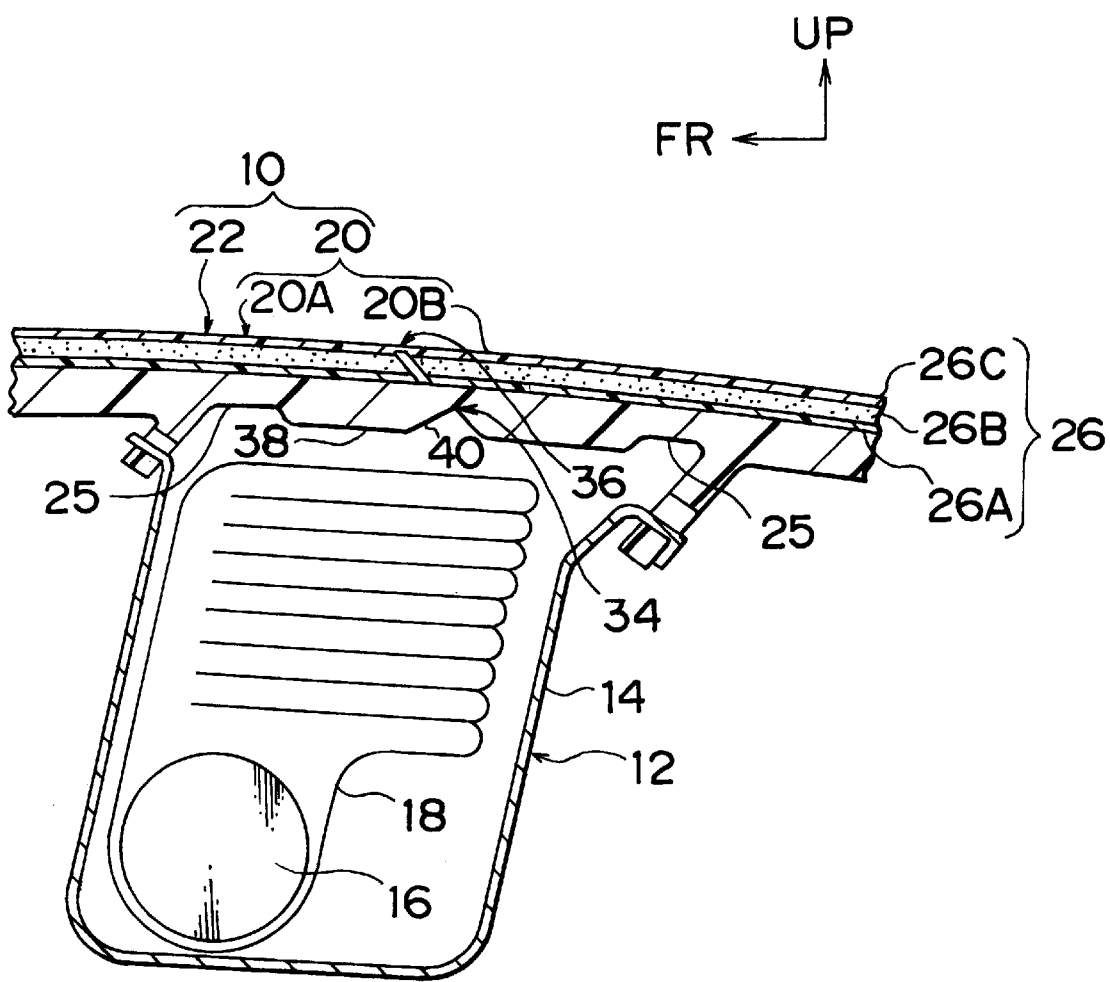
FIG. 4 is an enlarged sectional view taken along line IV—IV in FIG. 5.
Figure 5:
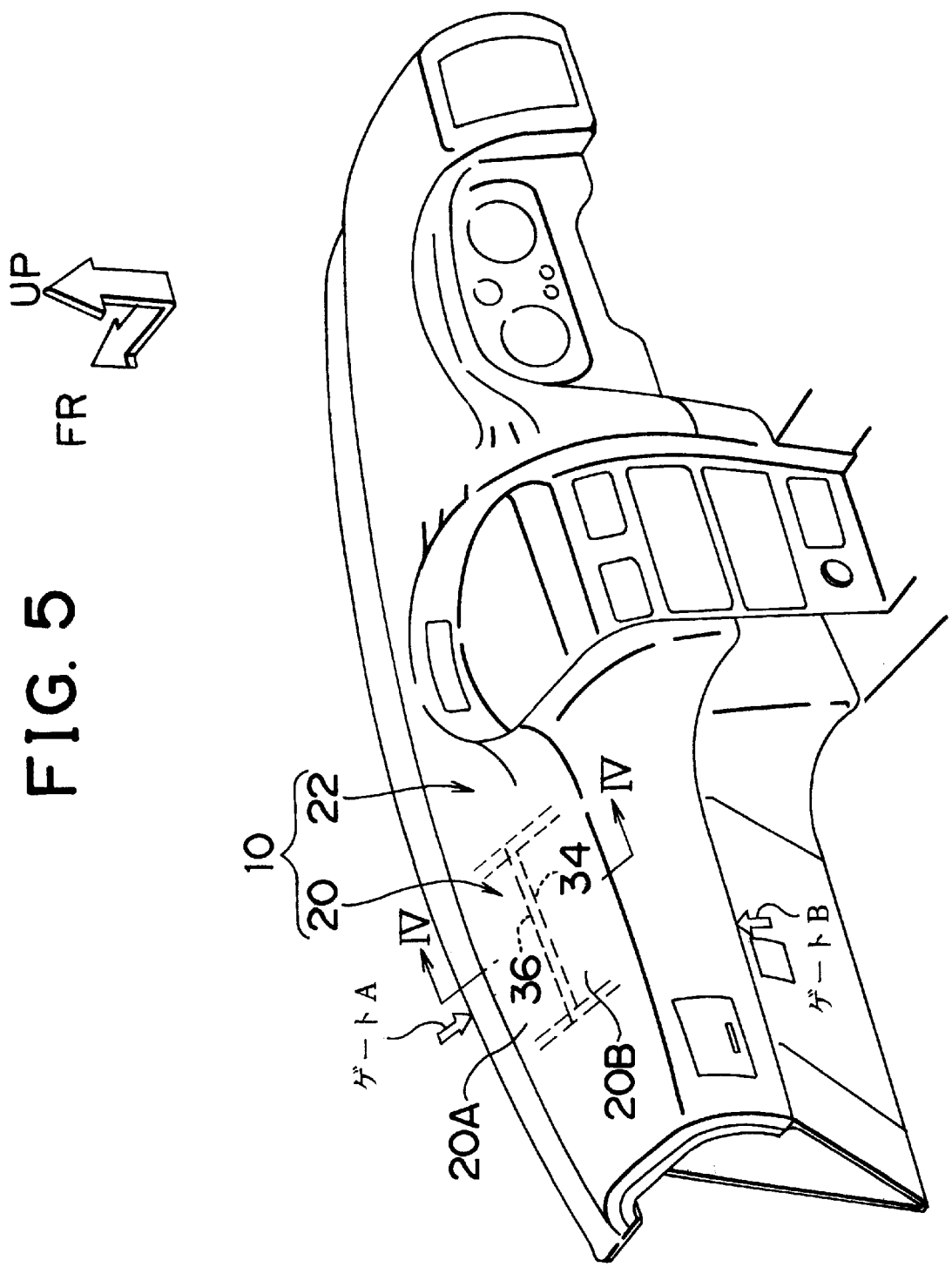
FIG. 5 is a perspective view of an instrument panel as the vehicle interior member having the air bag door portion according to the embodiment of the present invention seen from a diagonally rear direction of a vehicle.

As shown in FIG. 5, an air bag system (partially shown in FIG. 4) is disposed inward of the instrument panel 10 on a passenger seat side (the left side in FIG. 5). The instrument panel 10 functions as the vehicle interior member provided within the inside space of the vehicle.

As shown in FIG. 4, an air bag case 14 of an air bag system 12 is fixed to an instrument panel reinforcement (not shown), and an inflator 16 and an air bag 18 in a folded state are accommodated in the air bag case 14.

A portion of the instrument panel 10, which substantially faces the air bag case 14 constitutes an air bag door portion 20, and the other portion of the instrument panel 10 constitutes a body portion 22.

A substrate 24 of the air bag door portion 20 and the body portion 22 is formed of PP (polypropylene) resin with a low specific gravity, such as a rigid resin with a coefficient of bending elasticity, for example, ranging from 1500 to 3000 Mpa. The aforementioned resin is obtained by broying (a technique for producing macromolecular multicomponent material expected to provide a synergistic effect) elastomer (rubber) and PP (polypropylene) and adding talc to form the composite and reinforced resin. The resin further exhibits impact-resistance, rigidity, and good flowability suitable for a product having a thin portion. The substrate 24 can also be formed of a hard resin selected from PP resin, PC/ABS resin, PC/AES resin, PC/ASA resin, PC/ASiS resin, denatured PPO resin, PC/PBT resin, ABS resin, ABS resin, ASA resin, ASiS resin, PC resin, ASG resin, TPO resin, TPE resin, TPU resin, and PC/denatured PS resin.

Hinge portions 25 are respectively formed at a front end portion of the front door portion 20A and the rear end portion of a rear door portion 20B of the air bag portion 20. At the hinge portions 25, recessed portions are formed through a predetermined width in a front and rear direction on a back face of the substrate 24.

A three-layer skin 26 is disposed on a surface (design face) of the substrate 24. The three-layer skin 26 is formed of a barrier layer 26A, a foam layer 26B, and a skin layer 26C disposed from the substrate 24. In the present embodiment, the barrier layer 26A and the foam layer 26B are made of the PP resin, and the skin layer 26C is made of PVC or TPO resin.

In the air bag system 12, when a sudden deceleration of the vehicle is detected by a mechanical or electrical acceleration sensor and the like (not shown), the inflator 16 in the air bag case 14 is actuated to inflate the air bag 18 folded and accommodated in the air bag case 14 toward the air bag door portion 20 of the instrument panel 10. The air bag 18 pushes the air bag door portion 20 of the instrument panel 10 so as to tear and deploy the air bag door portion 20 toward the passenger space. As a known general structure can be applied to the air bag system 12, specific descriptions of the air bag system 12 will be omitted in this embodiment.

A substrate side tear line 34 is formed in the substrate 24 of the air bag door portion 20 and a skin side tear line 36 is formed in the three-layer skin 26.

Figure 3:
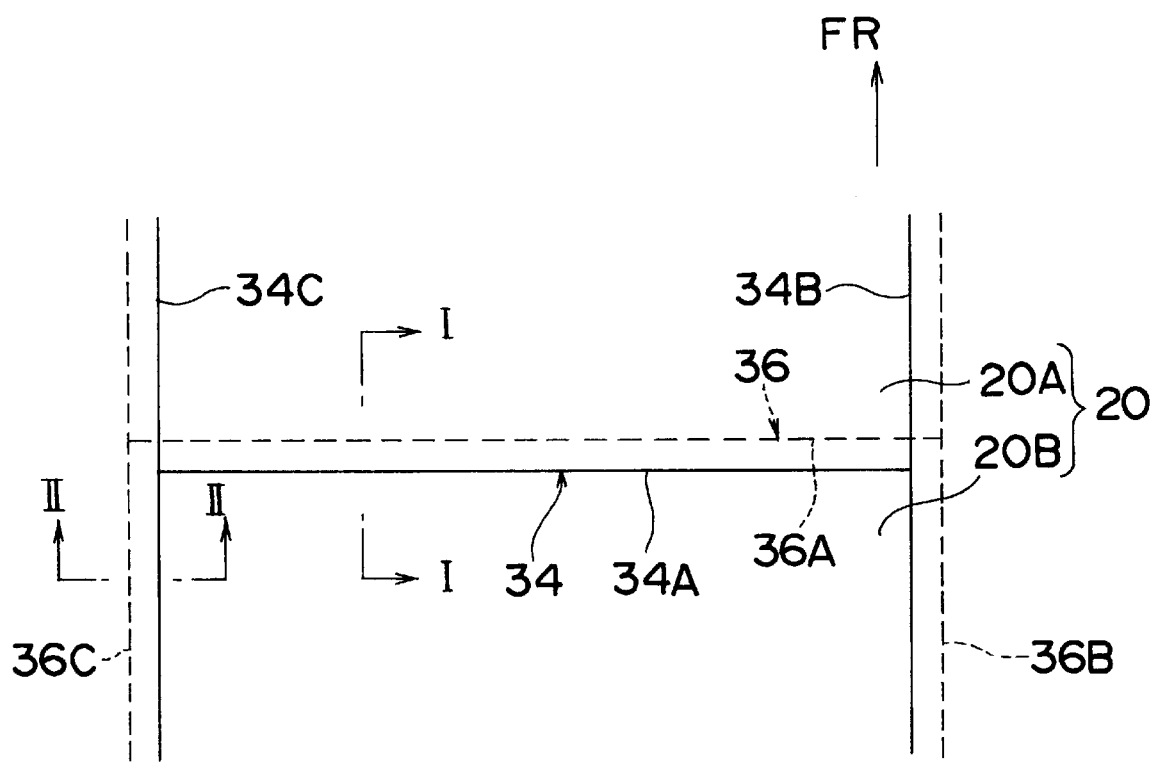
FIG. 3 is a plan view of a back face of a vehicle interior member having an air bag door portion according to an embodiment of the present invention.

As shown in FIG. 3, the substrate side tear line 34 forms an H-shape in the plan view including a lateral tear line 34A constituting substantially a center portion of the air bag door portion 20 in a front and rear direction, and a left and right pair of longitudinal tear lines 34B and 34C constituting opposite end portions of the air bag door portion 20 in a lateral direction.

A lateral tear line 36A of the skin side tear line 36 is formed to the fore of the lateral tear line 34A of the substrate side tear line 34 to be substantially parallel therewith. Longitudinal tear lines 36B and 36C of the skin side tear line 36 are formed at outer portions of the door of the longitudinal tear lines 34B and 34C of the substrate side tear line 34 to be substantially parallel therewith.

As a result, upon deployment of the air bag, the substrate 24 of the air bag door portion 20 is torn along the substrate side tear line 34 and the three-layer skin 26 is torn along the skin side tear line 36 to be divided into two parts opened forward and rearward, respectively.

As shown in FIG. 1, the lateral tear line 36A of the skin side tear line 36 is formed of a diagonal cut portion 38 extending diagonally forward from the barrier layer 26A side (back face side) of the three-layer skin 26 at a predetermined inclination angle θ1. The lateral tear line 34A of the substrate side tear line 34 is formed at a groove portion 40 which is V-shaped in section such that a thickness of the substrate 24 becomes H1.

Figure 2:
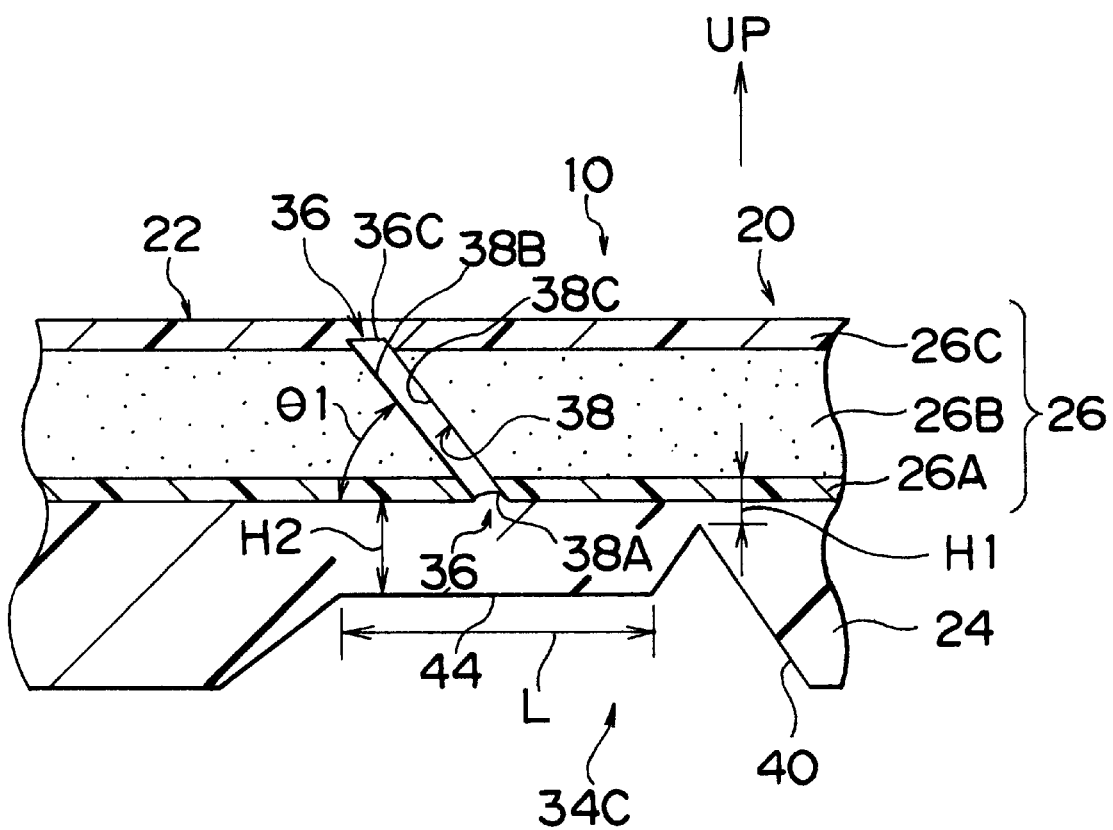
FIG. 2 is an enlarged sectional view taken along line II—II in FIG. 3.

As shown in FIG. 2, the longitudinal tear line 36C of the skin side tear line 36 is formed as a diagonal cut portion 38 extending diagonally outward of the door from the barrier layer 26A side (back face side) of the three-layer skin 26 at a predetermined inclination angle θ1. The longitudinal tear line 34C of the substrate side tear line 34 is defined by a groove portion 40 formed such that the thickness of the substrate 24 becomes H1 and a thin inner portion 44 with a thickness of H2 and a width of L which is adjacent to the groove portion 40 and extends outward of the door to reach an opening portion 38A of the diagonal cut portion 38 (the thin inner portion 44 extends to pass the opening portion 38A in the embodiment). The longitudinal tear line 36B of the skin side tear line 36 and the longitudinal tear line 34B of the substrate side tear line 34 have similar constructions.

Next, a method for molding the instrument panel of the embodiment of the present invention will be described in detail.

Figure 6:
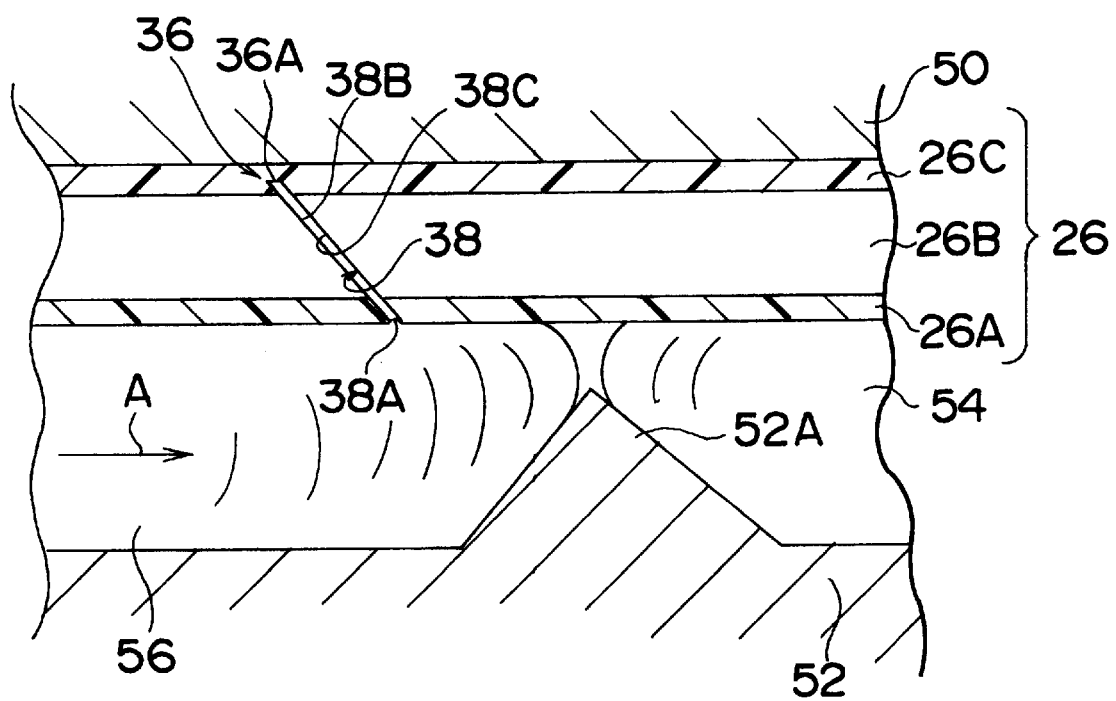
FIG. 6 is a sectional view illustrating a step of a method for molding the vehicle interior member having the air bag door portion according to the embodiment of the invention, corresponding to FIG. 1.

First, as shown in FIG. 6, the three-layer skin 26 having a diagonal cut portion 38 for deployment of the air bag door portion is set in the upper mold 50 as a mold on the design side of the instrument panel. The upper mold 50 and the lower mold 52 are assembled.

Next, a hard resin is injected through a predetermined different gate A and B (see FIG. 5) to perform insert molding of the front door portion 20A and the rear door portion 20B of the air bag door portion 20.

At this time, in the vicinity of the lateral tear line 36A of the skin side tear line 36, a projecting portion 52A for forming the groove portion 40 in the substrate is formed on the lower mold 52 along the diagonal cut portion 38. The projecting portion 52A is formed in a cutting direction (the right side shown in FIG. 6) of the opening portion 38A of the diagonal cut portion 38 and intercepts a flow of the resin 54 from the cutting direction (the right side shown in FIG. 6) of the diagonal cut portion 38. As a result, at the opening portion 38A of the diagonal cut portion 38 of the three-layer skin 26, the resin 56 flows in a reverse direction (a direction shown by the arrow A in FIG. 6) to the cutting direction of the diagonal cut portion 38.

Figure 7:
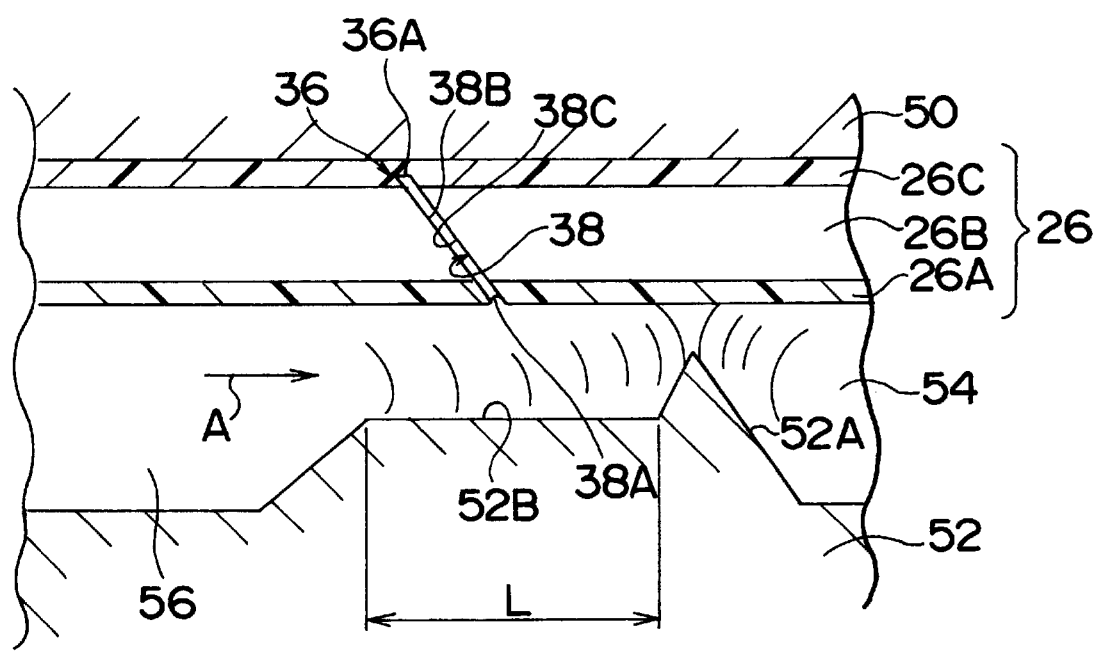
FIG. 7 is a sectional view illustrating a step of a method for molding the vehicle interior member having the air bag door portion according to the embodiment of the invention, corresponding to FIG. 2.

As shown in FIG. 7, in the vicinity of the longitudinal tear line 36C of the skin side tear line 36, a projecting portion 52A for forming the groove portion 40 in the substrate and a projecting portion 52B for forming a thin portion 44 in the substrate are formed on the lower mold 52 along the diagonal cut portion 38. The projecting portion 52A is formed in a cutting direction (the right side shown in FIG. 7) as a direction of the opening portion 38A of the diagonal cutting portion 38 to intercept a flow of the resin 54 from the cutting direction (the right side shown in FIG. 7) of the diagonal cut portion 38. The projecting portion 52B extends to pass the opening portion 38A of the diagonal cut portion 38 having a width L such that the resin can not easily flow toward the diagonal cut portion 38 from the front and rear direction. As a result, at the opening portion 38A of the diagonal cut portion 38 of the three-layer skin 26, the resin 56 flows in a reverse direction (direction shown by the arrow A in FIG. 7) to the cutting direction of the diagonal cut portion 38.

Figure 9:
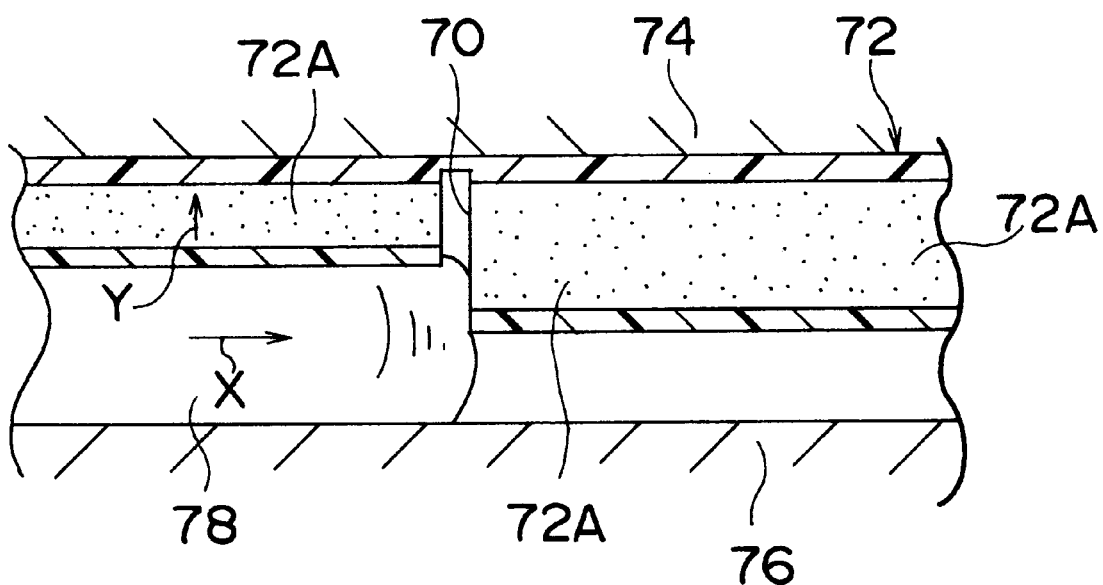
FIG. 9 is a sectional view illustrating a step of a conventional method for molding a vehicle interior member having an air bag door portion.

Therefore, in the embodiment, if the three-layer skin 26 is compressed by the resin 56, a side face 38B of the diagonal cut portion 38 on an upstream side of the resin flow is brought into close contact with a side face 38C of the diagonal cut portion 38 on a downstream side of the resin flow. Therefore, a thickness difference in sections of the three layer skin 26 divided by the diagonal cut portion 38 is hardly generated compared with the conventional art shown in FIG. 9. As a result, a flow of the resin 56 from the opening portion 38A of the diagonal cut portion 38 into the foam layer 26B of the three layer skin 26 can be intercepted, thus preventing the foam layer 26B from being melted and damaged. This allows the air bag door portion to be made invisible and the design to be improved.

The present embodiment can easily be achieved by adjusting the inclination angle θ1 of the diagonal cut portion 38 of the three-layer skin 26, the thickness H1 of the substrate 24 of the groove portion 40, and the thickness H2 of the substrate 24 of the thin portion 44 for the substrate side tear line.

In the embodiment, as shown in FIG. 3, the lateral tear line 36A of the skin side tear line 36 is formed to the fore of the lateral tear line 34A of the substrate side tear line 34 to be substantially parallel therewith, and the longitudinal tear lines 36B and 36C of the skin side tear line 36 are formed outward of the door of the longitudinal tear lines 34B and 34C of the substrate side tear line 34 to be substantially parallel therewith. In other words, the diagonal cut portion 38 for the skin side tear line 36 and the groove portion 40 for the substrate side tear line 34 are shifted from each other such that an edge of the substrate 24 of the rear door portion 20B that is torn and deployed upon deployment of the air bag door portion is hidden by an end portion of the three-layer skin 26. As a result, the edge portion of the substrate 24 of the rear door portion 20B which is torn and deployed at deployment of the air bag door is not exposed.

Although the present invention has been specifically described according to specific embodiments, it will be clear to a person skilled in the art that the present invention is not limited to the embodiments and various other embodiments may be made within the scope of the invention. For example, the gates A and B are respectively disposed to the fore and to the rear of the H-shaped tear line as shown in FIG. 5 in the above embodiments. The positions of the gates A and B, however, are not limited to those in the embodiments, and the gates A and B may be disposed on the left and right sides of the H-shaped tear line, respectively. In this case, the thin portion 44 is formed along the lateral tear line 34A parallel with the flow of the resin.

The present invention is not limited to the air bag door portion which is divided into two sections opened in opposite directions in which the substrate side tear line 34 and the skin side tear line 36 are formed into the H shape in the plan view as shown in FIG. 3. It may also be applied to a vehicle interior member having an air bag door portion in which the substrate side tear line 34 and the skin side tear line 36 form an angular U shape, X shape, or other shape in the plan view.

The present invention may also be applied to an instrument panel having an air bag door portion in which a body portion and an air bag door portion of the instrument panel are independent and injection molded separately, and then integrated together by using engaging claws, screws or the like.

Figure 8:
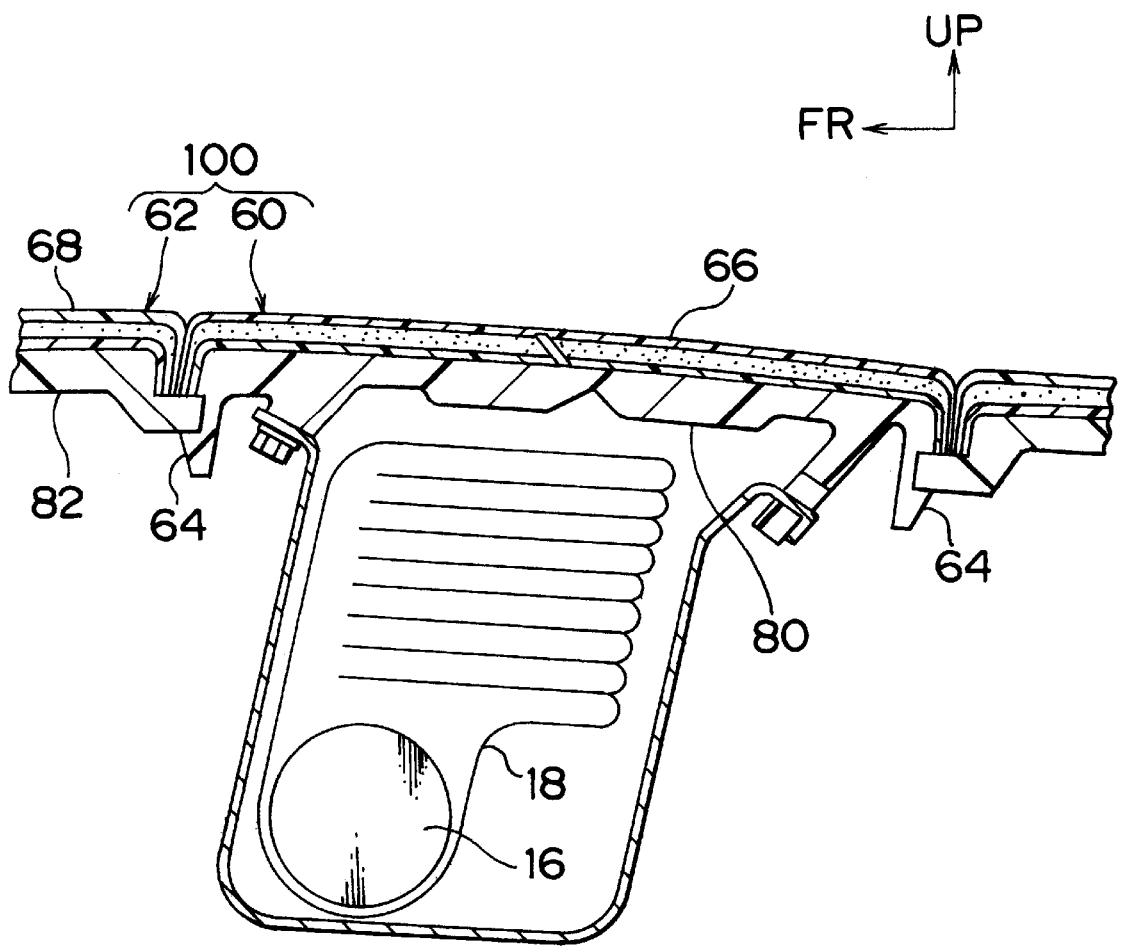
FIG. 8 is a sectional view of a vehicle interior member having an air bag door portion according to another embodiment of the invention.

Although the above-described instrument panel 10 is formed by injection molding the substrate of the air bag door portion 20 and the substrate of the body portion 22, the invention is also applicable to an instrument panel 100 having an air bag door portion as shown in FIG. 8 wherein an air bag door portion 60 and a body portion 62 are separately formed by injection molding, and then joined by using engaging nails 64, screws and the like. In this case, a three-layer skin is formed by an air bag door portion skin 66 and a body portion skin 68. The instrument panel 100 can be formed as follows. First, the air bag door portion skin 66 is set in an upper mold. After the upper mold is joined with a lower mold, a hard resin is injected into the cavity defined by the upper and lower molds, thereby forming an air bag door portion 60. Separately, the body portion skin 68 having an opening at a site where the air bag door portion will later be fitted is set in a mold, and a hard resin is injected thereinto, thereby forming a body portion 62. The air bag door portion 60 and the body portion 62 separately formed are joined by fitting the air bag door portion into the opening of the body portion, and fixing them via engaging nails 64, screws or the like. Since the air bag door portion 60 and the body portion 62 are separately formed, the instrument panel 100 makes it possible to freely select materials for the air bag door portion 60, the body portion 62, the skins 66, 68 thereof, and substrates 80, 82 thereof Considering the design face, the air bag door portion skin 66 and the air bag door portion skin 68 may be formed from the same material in order to make the air bag door portion 60 inconspicuous. The air bag door portion substrate 80 and the body portion substrate 82 may be formed from different kinds of hard resins in accordance with their performance requirements.

The vehicle interior member having the air bag door portion of the present invention may also be applied to a door trim, a center pillar garnish, a steering wheel pad and the like, in addition to the instrument panel. The resin may be filled through both the gates A and B, and may also be filled through a single gate either A or B.

What is claimed is:

1. A vehicle interior member having an air bag door portion comprising:

a three-layer skin;

a body portion substrate formed of a hard resin material and injection molded together with said three-layer skin; and an air bag door portion substrate formed of the same hard resin material as said body portion and injection molded integrally with said body portion substrate, wherein said air bag door portion substrate has a groove portion forming a substrate side tear line that is formed during said injection molding to define a shape of a projecting portion formed on a mold and torn upon deployment of an air bag, said three-layer skin has a face close to said air bag door portion substrate, and said three-layer skin has a diagonal cut portion for a skin side tear line that is formed to extend from said face of said three-layer skin at a predetermined inclination angle such that an opening portion of said diagonal cut portion is directed substantially toward the groove portion for said substrate side tear line.

2. A Vehicle interior member according to claim 1, wherein said diagonal cut portion and said groove portion are positioned are positioned such that a passenger-side edge of the air bag door portion substrate which has been torn and deployed upon deployment of the air bag door is hidden by the skin.

3. A vehicle interior member according to claim 2, wherein the groove portion forming said substrate side tear line extends in a direction of the width of a vehicle, and the diagonal cut portion forming said skin side tear line extends in a direction of the width of the vehicle at a predetermined interval from the groove portion forming said substrate side tear line to the front of the vehicle.

4. A vehicle interior member having an air bag door portion comprising:

an air bag door portion having a three-layer skin, and a substrate formed of a hard resin and injection molded together with said three-layer skin; and a body portion to which said air bag door portion is fixed, wherein said air bag door portion substrate has a groove portion forming a substrate side tear line that is formed during said injection molding to define a shape of a projecting portion formed on a mold and is torn upon deployment of an air bag, said three-layer skin has a face close to said air bag door portion substrate, and said three-layer skin has a diagonal cut portion forming a skin side tear line that is formed to extend from a face of said three-layer skin at a predetermined inclination angle such that an opening portion of said diagonal cut portion is directed toward the groove portion forming said substrate side tear line.

5. A vehicle interior member according to claim 4, wherein said body portion includes a skin having a design face formed of a same kind of material as said three-layer skin and a substrate formed of a hard resin, said body portion having an opening to which said air bag door portion is fixed.

6. A vehicle interior member according to claim 5, wherein said skin of said body portion is a three-layer skin formed of a same kind of material as said three-layer skin of said air bag door portion and said substrate of said body portion is formed of a hard resin different from said hard resin of said substrate of said air bag door portion.

7. A vehicle interior member according to claim 4, wherein said diagonal cut portion and said groove portion as positioned such that a passenger-side edge of the substrate which has been torn and deployed upon deployment of the air bag door is hidden by the skin.

8. A vehicle interior member according to claim 7, wherein the groove portion forming said substrate side tear line extends in a direction of the width of a vehicle, and the diagonal cut portion forming said skin side tear line extends in a direction in a direction of the width of the vehicle at predetermine interval from the groove portion forming said substrate side tear line to the front of the vehicle.

9. A vehicle interior member having an air bag door portion comprising:
   a three-layer skin formed of an interior layer, an intermediate layer and an exterior layer;
   a body portion substrate formed of a hard resin material and injection molded together with said three-layer skin; and
   an air bag door portion substrate formed of a same hard resin material as said body portion substrate and injection molded integrally therewith,
   wherein said three-layer skin has a diagonal cut portion forming a skin side tear line which has a cutting direction inclined in a direction substantially reverse to a flow direction of the hard resin used during injection molding of said body portion substrate and said air bag door portion substrate and is torn upon deployment of an air bag, the diagonal cut portion including two substantially parallel walls that extend entirely through the interior and intermediate layers and partially extend through the exterior layer of the three-layer skin.

10. A vehicle interior member according to claim 9, wherein said air bag door portion substrate has a groove for a substrate side tear line that is spaced from an opening of said diagonal cut portion by a predetermined interval in said flow direction of the hard resin, and which is torn upon deployment of the air bag.

11. A vehicle interior member according to claim 10, wherein said skin side tear line and a substrate side tear line extend in a direction substantially parallel to said flow direction of the hard resin, and said air bag door portion substrate has a thin portion that is thinner than a panel portion of the air bag door portion and that is formed adjacent to said groove, said thin portion being positioned at a site facing an opening portion of said diagonal cut portion and extending along the opening portion of said diagonal cut portion in a direction substantially parallel to said flow direction of the hard resin.

12. A vehicle interior member according to claim 9,
   wherein said hard resin is injected in a front-to-rear direction relative to a vehicle to which the vehicle interior member is to be fit,
   each of said skin side tear line and a substrate side tear line is formed in a generally "H" shaped tear line including a lateral tear line extending in a direction of a vehicle width and longitudinal tear lines each extending through a corresponding one of opposite end portions of said lateral tear line in the front-to-rear direction relative to the vehicle,
   said diagonal cut portion forming said lateral tear line of said skin side tear line is spaced from a groove forming said lateral tear line of said substrate side tear line by a predetermined interval toward a vehicle front, and
   said diagonal cut portion forming each longitudinal tear line of said skin side tear line is spaced from a groove forming a corresponding one of said longitudinal tear lines of said substrate side tear line by a predetermined interval in an outward direction with respect to the air bag door portion.

13. A vehicle interior member according to claim 12, wherein in said longitudinal tear lines, said air bag door portion substrate has a thin portion that is thinner than a panel portion of the air bag door portion and is formed adjacent to said groove forming said substrate side tear line, said thin portion being positioned at a site facing an opening portion of said diagonal cut portion forming said skin side tear line and extending along the opening portion of said diagonal cut portion in a direction substantially parallel to said flow direction of the hard resin.

14. A vehicle interior member having an air door bag portion, comprising:
   an air bag door portion having a three-layer skin and a substrate formed of a hard resin and injection molded together with said three-layer skin, the three-layer skin including an interior layer, an intermediate layer and an exterior layer; and
   a body portion to which said air bag door portion is fixed,
   wherein said three-layer skin has a diagonal cut portion for a skin tear line that has a cutting direction inclined in a direction substantially reverse to a flow direction of the hard resin during injection molding of said air bag door portion substrate and is torn upon deployment of an air bag, the diagonal cut portion including two substantially parallel walls that extend entirely through the interior and intermediate layers and extend partially through the exterior layer.

15. A vehicle interior member according to claim 14, wherein said air bag door portion substrate has a groove for a substrate side tear line that is spaced from an opening of said diagonal cut portion by a predetermined interval in said flow direction of the hard resin, and which is torn upon deployment of the air bag.

16. A vehicle interior member according to claim 14, wherein said hard resin is injected in a front-rear direction relative to a vehicle to which the vehicle interior member is to be fit,
   each of said skin side tear line and a substrate side tear line is a generally "H" shaped tear line including a lateral tear line extending in a direction of a vehicle width and longitudinal tear lines each extending through a corresponding one of opposite end portions of said lateral tear line in a front-rear direction relative to the vehicle,
   said diagonal cut portion forming said lateral tear line of said skin side tear line is spaced from a groove forming said lateral tear line of said substrate side tear line by a predetermined interval toward a vehicle front, and said diagonal cut portion forming each longitudinal tear line of said skin side tear line is spaced from a groove forming a corresponding one of said longitudinal tear lines of said substrate side tear line by a predetermined interval in an outward direction with respect to the air bag door portion.

17. A vehicle interior member according to claim 16, wherein in said longitudinal tear lines, said air bag door portion substrate has a thin portion that is thinner than a panel portion of the air bag door portion and is formed adjacent to said groove forming said substrate side tear line, said thin portion being positioned at a site facing an opening portion of said diagonal cut portion forming said skin side tear line and extending along the opening portion of said diagonal cut portion in a direction substantially parallel to said flow direction of the hard resin.

* * * * *